United States Patent
Morimoto et al.

(10) Patent No.: US 11,581,747 B2
(45) Date of Patent: Feb. 14, 2023

(54) POWER SUPPLY DEVICE

(71) Applicant: Yazaki Corporation, Tokyo (JP)

(72) Inventors: Mitsuaki Morimoto, Shizuoka (JP);
Kazuo Sugimura, Shizuoka (JP);
Kazuya Tsubaki, Shizuoka (JP);
Eiichiro Oishi, Shizuoka (JP);
Yasuyuki Shigezane, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 129 days.

(21) Appl. No.: 17/155,060

(22) Filed: Jan. 21, 2021

(65) Prior Publication Data
US 2021/0249875 A1 Aug. 12, 2021

(30) Foreign Application Priority Data
Feb. 10, 2020 (JP) .............................. JP2020-020385

(51) Int. Cl.
*H02J 7/00* (2006.01)

(52) U.S. Cl.
CPC .......... *H02J 7/0024* (2013.01); *H02J 7/0048* (2020.01); *H02J 7/0068* (2013.01)

(58) Field of Classification Search
CPC ...... H02J 7/0013; H02J 7/0024; H02J 7/0063; H02J 7/0047; H02J 7/0048; H02J 7/0068
See application file for complete search history.

(56) References Cited

U.S. PATENT DOCUMENTS

| 5,568,038 A | * | 10/1996 | Tatsumi | H02J 9/061 320/164 |
| 8,614,871 B2 | * | 12/2013 | Takeda | G01R 31/3835 320/126 |
| 10,252,625 B2 | * | 4/2019 | Saint-Marcoux | H02J 7/0047 |
| 2018/0056798 A1 | | 3/2018 | Syouda | |
| 2018/0059498 A1 | * | 3/2018 | Coffin | G02F 1/163 |
| 2020/0185936 A1 | * | 6/2020 | Oishi | B60L 53/63 |

FOREIGN PATENT DOCUMENTS

| JP | 2018-33263 A | 3/2018 | |
| JP | 2019-80474 A | 5/2019 | |
| WO | 2019/082776 A1 | 5/2019 | |
| WO | WO-2019082776 A1 * | 5/2019 | ............... B60L 3/00 |

* cited by examiner

*Primary Examiner* — Richard Isla
*Assistant Examiner* — Sadia Kousar
(74) *Attorney, Agent, or Firm* — Kenealy Vaidya LLP

(57) ABSTRACT

In a power supply device, switching section switch a connection between batteries to a series connection or a parallel connection. In a case where the connection between the batteries is switched from the series connection to the parallel connection to charge the batteries by an external charger, a controller does not switch the connection to the parallel connection, does not charge one battery having a larger voltage out of the batteries, and separately charges the other battery when a potential difference between a voltage of the battery and a voltage of the battery is a predetermined threshold value or higher; and the controller switches the connection to the parallel connection and charges the batteries when the potential difference is lower than the threshold value.

1 Claim, 7 Drawing Sheets

POWER SUPPLY DEVICE

CROSS-REFERENCE TO RELATED APPLICATION(S)

The present application claims priority to and incorporates by reference the entire contents of Japanese Patent Application No. 2020-020385 filed in Japan on Feb. 10, 2020.

BACKGROUND OF THE INVENTION

1. Field of the Invention

The present invention relates to a power supply device.

2. Description of the Related Art

In the related art, as a power supply device, for example, it is disclosed in Japanese Patent Application Laid-open No. 2018-033263 that a quick charging device includes first and second battery modules, in which the first and second battery modules are connected in series while being charged, and the first and second battery modules are connected in parallel while being discharged.

In the quick charging device described in Japanese Patent Application Laid-open No. 2018-033263, there is a case where a series connection and a parallel connection are selectably used according to a charging voltage at which charging is performed, and in such a case also, it is desired that the first and second battery modules are properly charged.

SUMMARY OF THE INVENTION

The present invention has been made in view of the above description, and an object of the present invention is to provide a power supply device capable of properly charging batteries the connection of which can be switched between a series connection and a parallel connection.

In order to achieve the above mentioned object, a power supply device according to one aspect of the present invention includes a first battery and a second battery that are electrically chargeable and dischargeable; a voltage detector that detects respective voltages of the first battery and the second battery; a switching section configured to switch a connection between the first battery and the second battery to a series connection or a parallel connection; and a controller configured to control the switching section, wherein in a case where the connection between the first battery and the second battery is switched from the series connection to the parallel connection to charge the first battery and the second battery by an external charger, the controller does not switch the connection between the first battery and the second battery to the parallel connection, does not charge one battery having a larger voltage out of the first battery and the second battery, and separately charges the other battery having a smaller voltage when a potential difference between the voltage of the first battery detected by the voltage detector and the voltage of the second battery detected by the voltage detector is a predetermined threshold value or higher, and the controller switches the connection between the first battery and the second battery to the parallel connection and charges the first battery and the second battery when the potential difference is lower than the threshold value.

According to another aspect of the present invention, in the power supply device, it is preferable that the controller controls the switching section to connect the external charger to the first battery and to supply constant current electric power from the external charger to the first battery for a certain period of time, and controls the switching section to connect the external charger to the second battery and to supply the constant current electric power from the external charger to the second battery for a certain period of time, the voltage detector detects the voltage of the first battery in a case where the constant current electric power is supplied from the external charger to the first battery, and detects the voltage of the second battery in a case where the constant current electric power is supplied from the external charger to the second battery, the controller calculates an actual voltage increase in the first battery per unit time in the certain period of time based on the voltage of the first battery detected by the voltage detector and calculates an actual voltage increase in the second battery per unit time in the certain period of time based on the voltage of the second battery detected by the voltage detector, and in a case where the potential difference is the threshold value or higher, the controller calculates a charging time based on the actual voltage increase in the first battery per unit time and the potential difference and charges the first battery based on the calculated charging time when the voltage of the first battery is smaller than the voltage of the second battery, and the controller calculates a charging time based on the actual voltage increase in the second battery per unit time and the potential difference and charges the second battery based on the calculated charging time when the voltage of the second battery is smaller than the voltage of the first battery.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

A mode for carrying out the present invention (an embodiment) will be described in detail with reference to the drawings. The present invention is not limited to the contents described in the following embodiment. In addition, the components described below include components that can be easily thought of by those skilled in the art and that are substantially the same. Furthermore, the configurations described below can be combined as appropriate. In addition, various omissions, substitutions, or changes of the configurations can be made without departing from the gist of the present invention.

Embodiment

Figure 1:
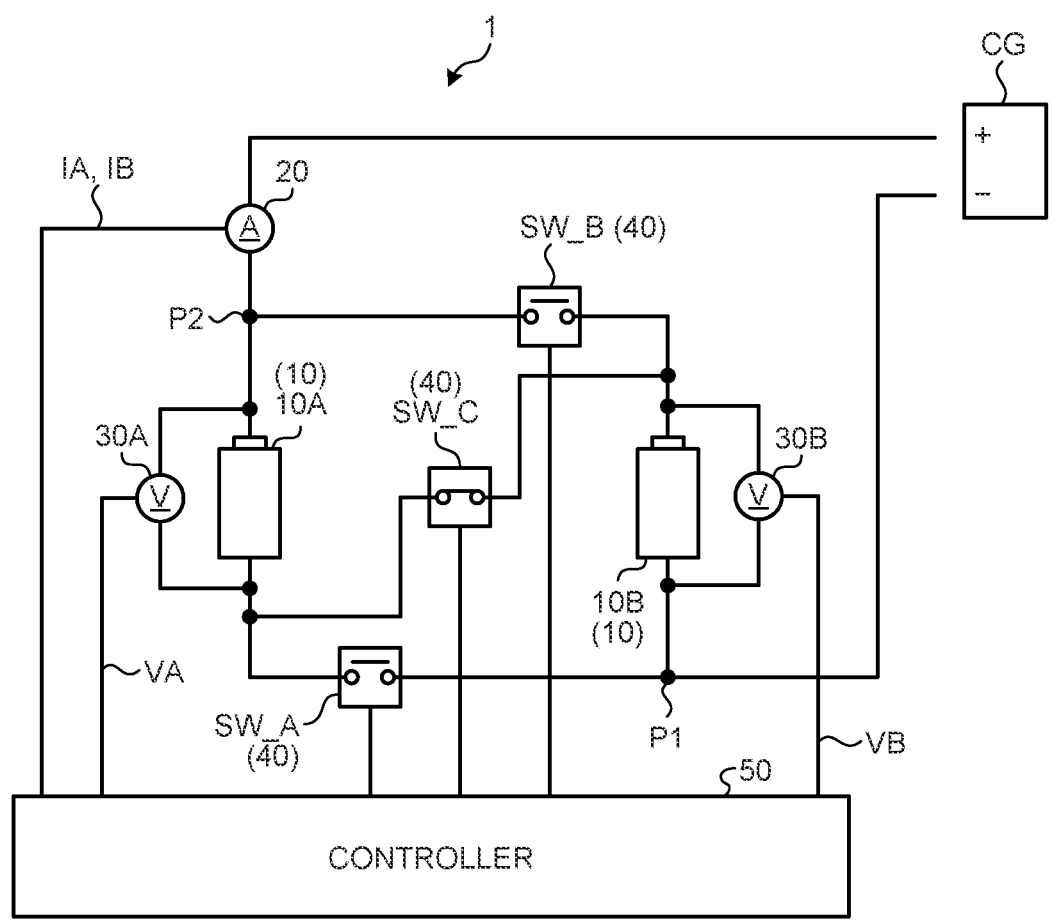
FIG. 1 is a block diagram illustrating a configuration example of a power supply device according to an embodiment.

A power supply device 1 according to an embodiment will be described with reference to the drawings. FIG. 1 is a block diagram illustrating a configuration example of the power supply device 1 according to the embodiment. The power supply device 1 is a high-voltage power supply device that is mounted on a vehicle such as an electric vehicle (EV) and supplies electric power to a high-voltage load section (for example, an inverter) provided in the vehicle. Hereinafter, the power supply device 1 will be described in detail.

As illustrated in FIG. 1, the power supply device 1 includes battery units 10, a current detector 20, voltage detectors 30A and 30B, switching section 40, and a controller 50.

The battery units 10 are connected to an external quick charger (external charger) CG and store electric power supplied from the quick charger CG. The battery units 10 supply the stored electric power to a high-voltage load section such as an inverter. The battery units 10 include a battery 10A as a first battery and a battery 10B as a second battery.

The battery 10A is a storage battery that is chargeable and dischargeable with direct current electric power, and includes a plurality of battery cells. The respective battery cells are formed of secondary batteries that are chargeable and dischargeable, and are formed of, for example, lithium ion batteries. The respective battery cells are connected in series with adjacent battery cells. The battery 10A stores therein the electric power supplied from the quick charger CG, and supplies the stored electric power to a high-voltage load section such as an inverter.

The battery 10B is formed in the same manner as the battery 10A. That is, the battery 10B is a storage battery that is chargeable and dischargeable with direct current electric power, and includes a plurality of battery cells. The respective battery cells are formed of secondary batteries that are chargeable and dischargeable, and are formed of, for example, lithium ion batteries. The respective battery cells are connected in series with adjacent battery cells. The battery 10B stores therein the electric power supplied from the quick charger CG, and supplies the stored electric power to a high-voltage load section such as an inverter.

The current detector 20 detects a current. The current detector 20 is provided between the quick charger CG and the battery units 10, and detects a current of the electric power supplied from the quick charger CG to the battery units 10. The current detector 20 detects, for example, a current IA of the electric power supplied from the quick charger CG to the battery 10A. In addition, the current detector 20 detects a current IB of the electric power supplied from the quick charger CG to the battery 10B. The current detector 20 is connected to the controller 50 and outputs the detected currents IA and IB to the controller 50.

The voltage detector 30A detects a voltage. The voltage detector 30A is connected in parallel with the battery 10A and detects a voltage between a positive electrode and negative electrode of the battery 10A. The voltage detector 30A is connected to the controller 50 and outputs a detected voltage VA of the battery 10A to the controller 50.

The voltage detector 30B detects a voltage. The voltage detector 30B is connected in parallel with the battery 10B and detects a voltage between a positive electrode and negative electrode of the battery 10B. The voltage detector 30B is connected to the controller 50 and outputs a detected voltage VB of the battery 10B to the controller 50.

The switching section 40 switch a connection between the battery 10A and the battery 10B. The switching section 40 switch the connection between the battery 10A and the battery 10B to a series connection or a parallel connection based on, for example, a switching signal output from the controller 50. The switching section 40 include a switch SW_A, a switch SW_B, and a switch SW_C. As the switches SW_A to SW_C, for example, a semiconductor relay, a mechanical relay, or the like may be used, but any switch may be used as far as the switch can allow or shut off the electric power to pass through a current path.

The switch SW_A is a switch that allows or shuts off the electric power to pass through the current path and that connects the battery 10A and the battery 10B in parallel. The switch SW_A is provided between a node P1 and the negative electrode of the battery 10A. Here, the node P1 is a node through which a negative electrode of the quick charger CG is connected to a connection wire connecting the negative electrodes of the batteries 10A and 10B. By turning the switch SW_A on, the negative electrode of the battery 10A and the negative electrode of the battery 10B are electrically connected to each other, and the negative electrode of the battery 10A and the negative electrode of the quick charger CG are electrically connected to each other. By turning the switch SW_A off, the negative electrode of the battery 10A and the negative electrode of the battery 10B are electrically shut off from each other, and the negative electrode of the battery 10A and the negative electrode of the quick charger CG are electrically shut off from each other.

The switch SW_B is a switch that allows or shuts off the electric power to pass through the current path and that connects the battery 10A and the battery 10B in parallel. The switch SW_B is provided between a node P2 and the positive electrode of the battery 10B. Here, the node P2 is a node through which a positive electrode of the quick charger CG is connected to a connection wire connecting the positive electrodes of the respective batteries 10A and 10B. By turning the switch SW_B on, the positive electrode of the battery 10A and the positive electrode of the battery 10B are electrically connected to each other, and the positive electrode of the battery 10B and the positive electrode of the quick charger CG are electrically connected to each other. By turning the switch SW_B off, the positive electrode of the battery 10A and the positive electrode of the battery 10B are electrically shut off from each other, and the positive electrode of the battery 10B and the positive electrode of the quick charger CG are electrically shut off from each other.

The switch SW_C is a switch that allows or shuts off the electric power to pass through the current path and that connects the battery 10A and the battery 10B in series. The switch SW_C is provided between the negative electrode of the battery 10A and the positive electrode of the battery 10B. By turning the switch SW_C on, the negative electrode of the battery 10A and the positive electrode of the battery 10B are electrically connected to each other, and by turning the switch SW_C off, the negative electrode of the battery 10A and the positive electrode of the battery 10B are electrically shut off from each other.

In the switching section 40 formed as described above, by turning the switches SW_A and SW_B on and turning the switch SW_C off based on the switching signal from the controller 50, the connection between the battery 10A and the battery 10B is switched to the parallel connection. In addition, in the switching section 40, by turning the switch SW_C on and turning the switches SW_A and SW_B off, the connection between the battery 10A and the battery 10B is switched to the series connection. Furthermore, the switching section 40, by turning the switch SW_A on and turning the switches SW_B and SW_C off, separately connect the battery 10A to the quick charger CG without connecting the battery 10B to the quick charger CG. Furthermore, the switching section 40, by turning the switch SW_B on and turning the switches SW_A and SW_C off, separately connect the battery 10B to the quick charger CG without connecting the battery 10A to the quick charger CG.

The controller 50 controls the switching section 40. The controller 50 includes an electronic circuit with a well-known microcomputer as a main component, the microcomputer including CPU, ROM and RAM constituting a storage section, and an interface. The controller 50 outputs the switching signal to the switching section 40, so that the connection between the batteries 10A and 10B is switched to the series connection or the parallel connection.

For example, in a case where the electric power is supplied to a load section (for example, an inverter) from the batteries 10A and 10B during traveling of the vehicle, the controller 50 switches the connection between the batteries 10A and 10B to the series connection, so that the electric power with a high-voltage (for example, about 1000 V) is supplied to the load section. In addition, in a case where the batteries 10A and 10B are charged by the quick charger CG, the controller 50 switches the connection between the batteries 10A and 10B to the series connection or the parallel connection according to a charging voltage of the electric power supplied from the quick charger CG. For example, in a case where the charging voltage of the electric power supplied from the quick charger CG is a relatively high-voltage (for example, about 1000 V), the controller 50 switches the connection between the batteries 10A and 10B to the series connection to charge the batteries 10A and 10B connected in series with the high-voltage (for example, about 1000V) electric power supplied from the quick charger CG. In contrast, in a case where the charging voltage of the electric power supplied from the quick charger CG is a relatively low-voltage (for example, about 500 V), the controller 50 switches the connection between the batteries 10A and 10B to the parallel connection to charge the batteries 10A and 10B connected in parallel with the low-voltage (for example, about 500 V) electric power supplied from the quick charger CG.

In a case where the electric power is supplied to the load section by the batteries 10A and 10B connected in series, and then the connection between the batteries 10A and 10B is switched from the series connection to the parallel connection to charge the batteries 10A and 10B with the low-voltage (for example, about 500 V) supplied from the quick charger CG, the controller 50 executes a process for equalizing the voltages of the batteries 10A and 10B. The controller 50 calculates, for example, a potential difference between the voltage VA of the battery 10A detected by the voltage detector 30A and the voltage VB of the battery 10B detected by the voltage detector 30B. Then, in a case where the calculated potential difference is compared with a predetermined threshold value, and the potential difference is lower than the threshold value, an excessive inrush current does not flow between the batteries 10A and 10B due to the potential difference. Therefore, the controller 50 switches the connection between the batteries 10A and 10B to the parallel connection to charge the batteries 10A and 10B.

In contrast, when the potential difference is the threshold value or higher, the excessive inrush current flows between the batteries 10A and 10B due to the potential difference. Therefore, the controller 50 does not switch the connection between the batteries 10A and 10B to the parallel connection, and executes first the process for equalizing the voltages of the batteries 10A and 10B. For example, as this equalization process, the controller 50 does not charge one battery having a larger voltage out of the battery 10A and the battery 10B, and separately charges the other battery having a smaller voltage. For example, when the voltage VA of the battery 10A is smaller than the voltage VB of the battery 10B, the controller 50 separately connects the battery 10A to the quick charger CG to charge the battery 10A without connecting the battery 10B to the quick charger CG. In contrast, when the voltage VB of the battery 10B is smaller than the voltage VA of the battery 10A, the controller 50 separately connects the battery 10B to the quick charger CG to charge the battery 10B without connecting the battery 10A to the quick charger CG.

Figure 2:
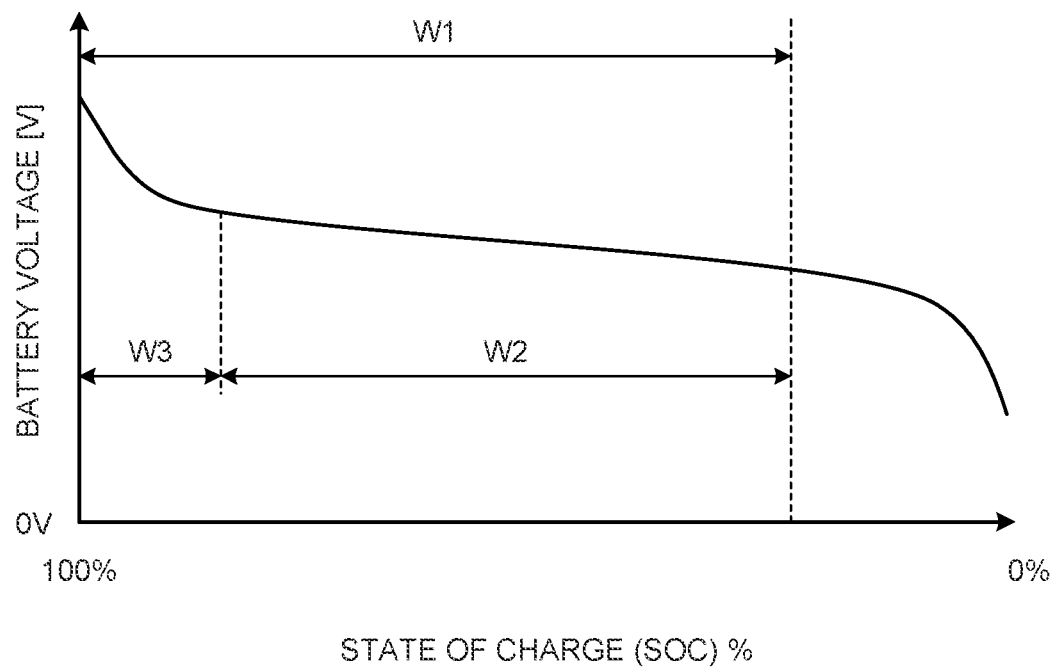
FIG. 2 is a diagram illustrating a relation between a battery voltage and a state of charge (SOC) according to the embodiment.
Figure 3:
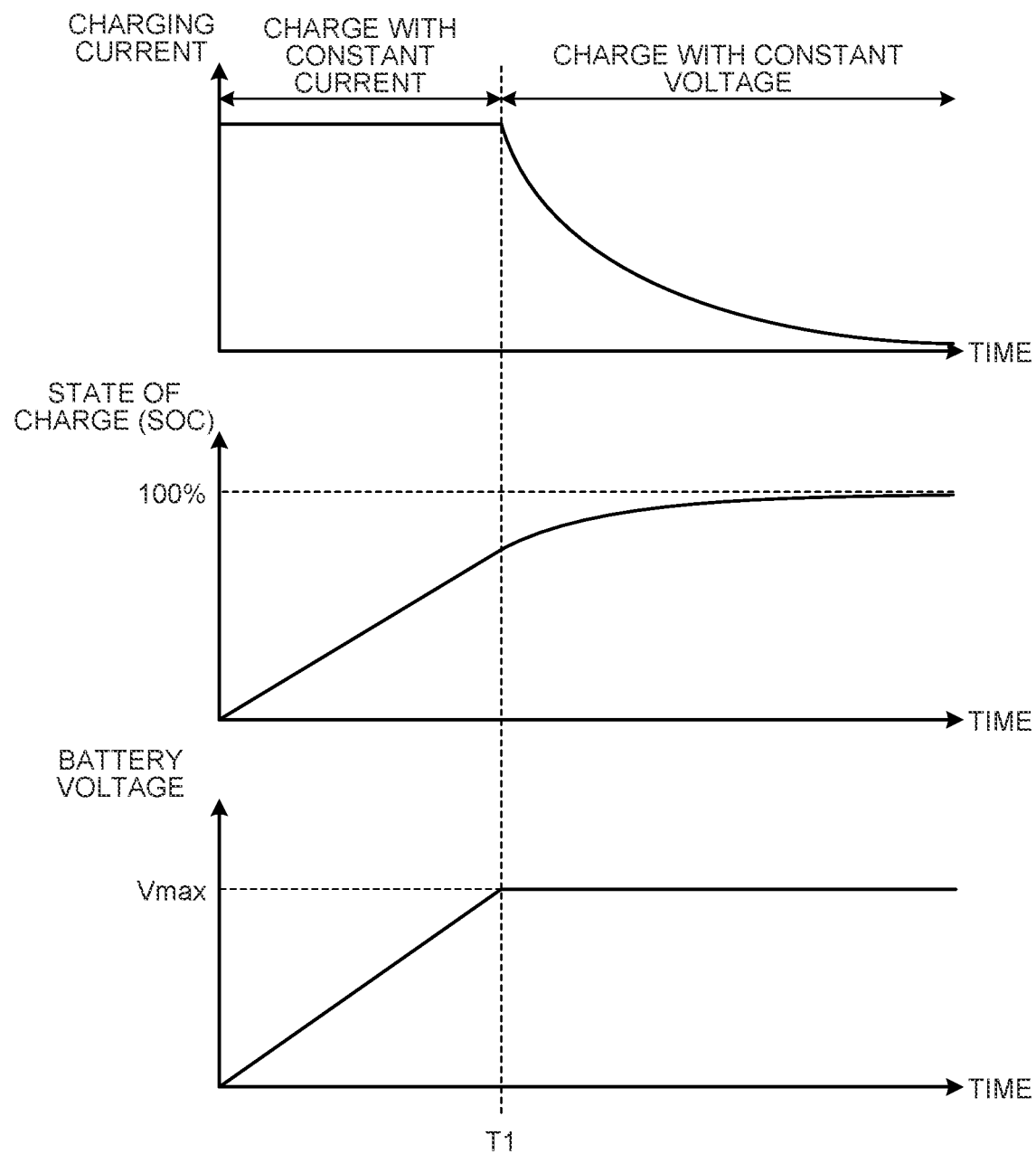
FIG. 3 is a diagram illustrating an example of quick charging according to the embodiment.
Figure 4:
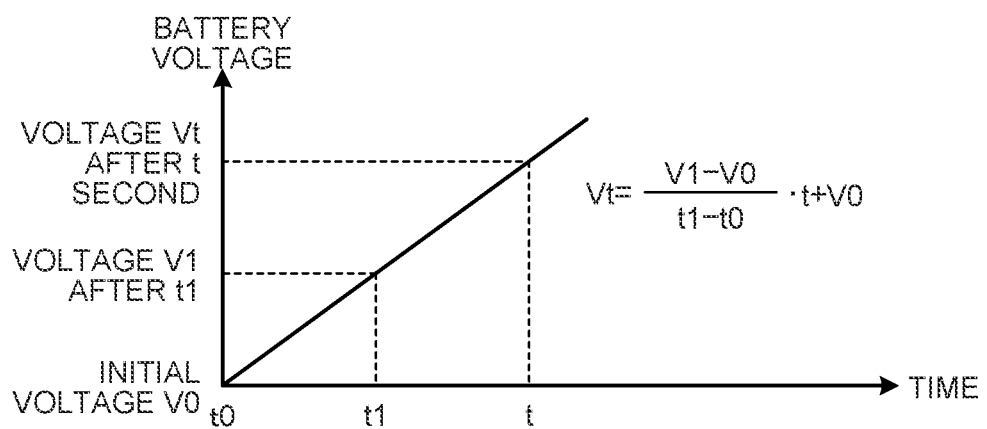
FIG. 4 is a diagram illustrating a relation between a voltage increase and a time according to the embodiment.

Next, the equalization process will be described in detail. FIG. 2 is a diagram illustrating a relation between a battery voltage and a state of charge (SOC) according to the embodiment. FIG. 3 is a diagram illustrating an example of quick charging according to the embodiment. FIG. 4 is a diagram illustrating a relation between a voltage increase and a time according to the embodiment. As illustrated in FIG. 2, in the batteries 10A and 10B, a usable range W1 of each of the batteries 10A and 10B is determined based on the state of charge. The usable range W1 is generally in a range of about 30% to 100% of the state of charge in each of the batteries 10A and 10B. The batteries 10A and 10B are each charged with constant current electric power in a range W2 (the state of charge is about 30% to 80%), which is a part of the usable range W1, and is charged with constant voltage electric power in a remaining range W3 (the state of charge is about 80% to 100%).

In the quick charging by the quick charger CG as illustrated in FIG. 3, for example, the batteries 10A and 10B are each charged with the constant current electric power until the battery voltage reaches an upper limit voltage Vmax (the state of charge is about 80%) at a time T1, and after the battery voltage reaches the upper limit voltage Vmax at the time T1, the batteries 10A and 10B are each charged with the constant voltage electric power to reduce a charging current. While the batteries 10A and 10B are each being charged with the constant voltage electric power, the charging current gradually decreases to be fully charged (the state of charge is 100%).

As illustrated in FIG. 3, the state of charge in each of the batteries 10A and 10B increases in proportion to time in a case where the batteries 10A and 10B are charged with the constant current electric power. In addition, the battery voltage of each of the batteries 10A and 10B also increases in proportion to time in the case where the batteries 10A and 10B are charged with the constant current electric power. Generally, since it is considered that the situation of using the quick charger CG is a situation in which the state of charge is small, charging is started with the constant current electric power. In a case of charging with the constant current electric power, the battery voltage increases in proportion to time as described above. For example, as illustrated in FIG. 4, in a case where an initial voltage V0, an initial voltage time t0, a charging end time t1, and a voltage V1 at the charging end time t1 are known, a battery voltage Vt in a case of charging with the constant current electric power during a charging time t can be calculated (see Expression (1) below). That is, it can be known that how much time the battery takes to be charged in order to eliminate the potential difference between the battery 10A and the battery 10B, from the proportional relation between the battery voltage and the charging time.

$$Vt=((V1-V0)/(t1-t0))\times t+V0 \quad (1)$$

Figure 5:
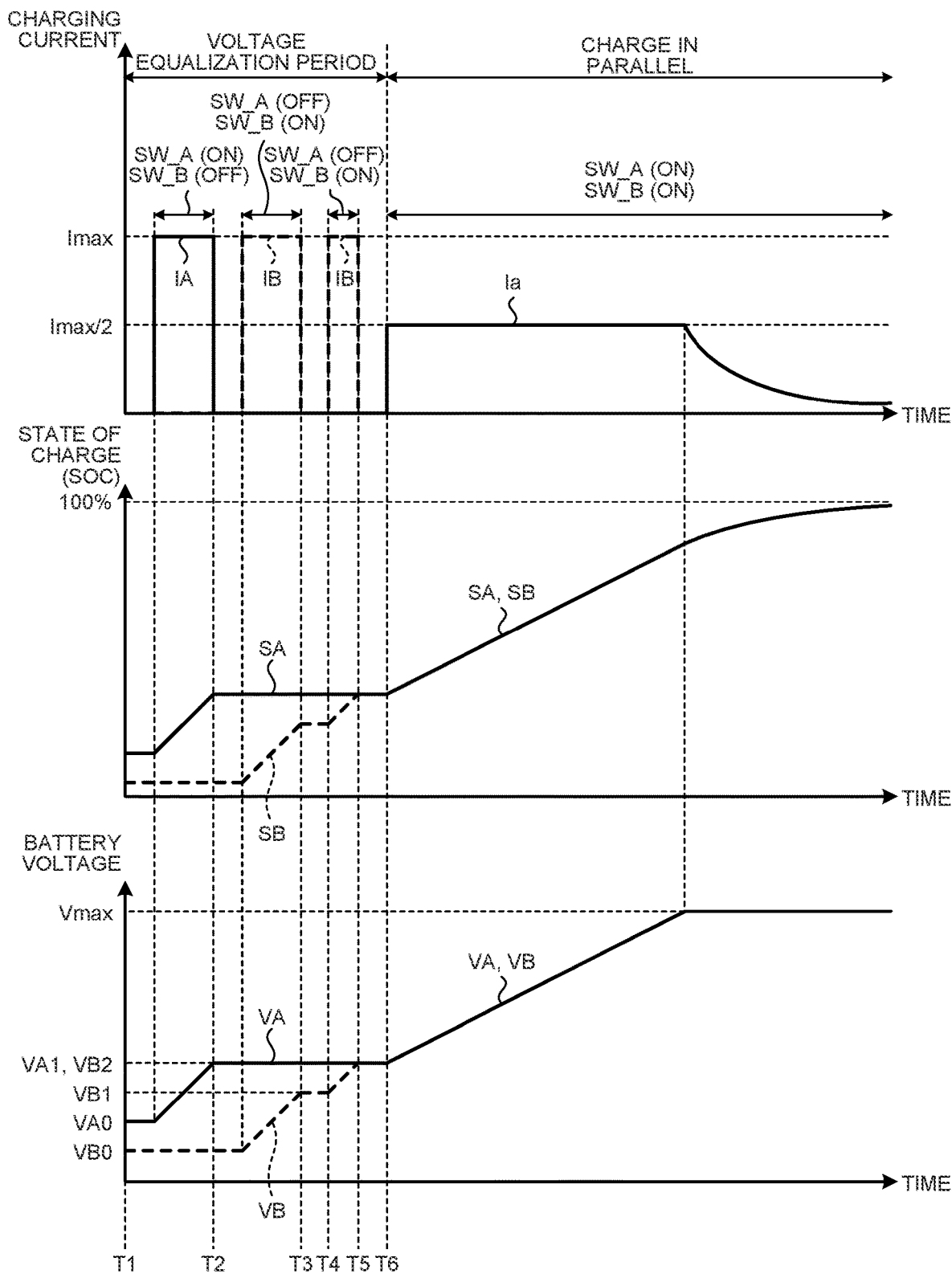
FIG. 5 is a timing chart illustrating a voltage equalization process according to the embodiment.

Next, an actual voltage equalization process will be described in detail. FIG. 5 is a timing chart illustrating the voltage equalization process according to the embodiment. In a case where the electric power is supplied to a load section (for example, an inverter) from each of the batteries 10A and 10B during traveling of the vehicle, the controller 50 switches the connection between the batteries 10A and 10B to the series connection. Therefore, in a case of charging by the parallel connection, the switch SW_C is firstly turned off. In this case, the switches SW_A and SW_B are also turned off.

At the time T1 illustrated in FIG. 5, the controller 50 firstly detects an initial voltage VA0 of the battery 10A by the voltage detector 30A, and detects an initial voltage VB0 of the battery 10B by the voltage detector 30B. Next, the controller 50 turns the switch SW_A on to separately connect the battery 10A to the quick charger CG without connecting the battery 10B to the quick charger CG. Then, the controller 50 supplies the constant current electric power from the quick charger CG to the battery 10A for a certain period of time. In this case, the current IA equivalent to a maximum current Imax of the quick charger CG flows through the battery 10A. The controller 50 turns the switch SW_A off at a time T2 after the certain period of time has elapsed, and detects the voltage VA1 of the battery 10A by the voltage detector 30A.

Next, the controller 50 turns the switch SW_B on to separately connect the battery 10B to the quick charger CG without connecting the battery 10A to the quick charger CG. Then, the controller 50 supplies the constant current electric power from the quick charger CG to the battery 10B for a certain period of time. In this case, the current IB equivalent to a maximum current Imax of the quick charger CG flows through the battery 10B. The controller 50 turns the switch SW_B off at a time T3 after the certain period of time has elapsed, and detects the voltage VB1 of the battery 10B by the voltage detector 30B.

The controller 50 calculates an actual voltage increase in the battery 10A per unit time in the certain period of time based on the voltage VA1 of the battery 10A detected by the voltage detector 30A. In addition, the controller 50 calculates an actual voltage increase in the battery 10B per unit time in the certain period of time based on the voltage VB1 of the battery 10B detected by the voltage detector 30B.

In a case where the potential difference between the voltage VA1 of the battery 10A and the voltage VB1 of the battery 10B is lower than the threshold value, the controller 50 turns the switches SW_A and SW_B on to switch the connection between the respective batteries 10A and 10B to the parallel connection, so that the batteries 10A and 10B are charged. In contrast, in a case where the potential difference between the voltage VA1 of the battery 10A and the voltage VB1 of the battery 10B is the threshold value or higher and the voltage VB1 of the battery 10B is smaller than the voltage VA1 of the battery 10A, the controller 50 calculates the charging time based on the actual voltage increase in the battery 10B per unit time and the potential difference. For example, in a case where the actual voltage increase per second is 3 V and the potential difference is 3 V, the controller 50 calculates that the charging time is one second. Then, the controller 50 separately charges the battery 10B between a time T4 and a time T5 based on the calculated charging time. In a case where the potential difference between the voltage VA1 of the battery 10A and the voltage VB2 of the battery 10B is lower than the threshold value after charging the battery 10B, the controller 50 turns the switches SW_A and SW_B on at a time T6 to switch the connection between the respective batteries 10A and 10B to the parallel connection, so that the batteries 10A and 10B are charged. In this case, a charging current Ia flowing through the batteries 10A and 10B connected in parallel is about half of the maximum current Imax of the quick charger CG.

Figure 6:
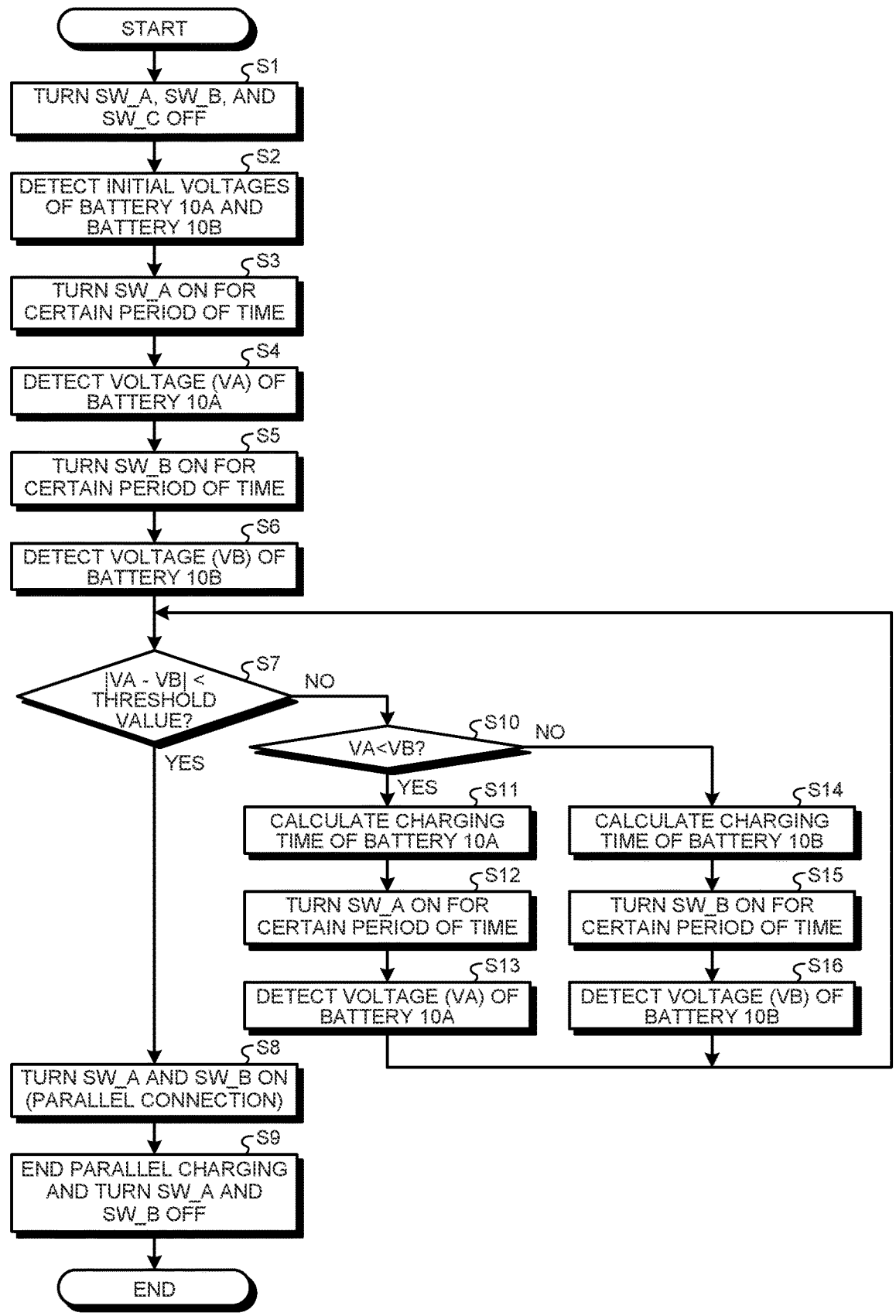
FIG. 6 is a flowchart illustrating an operation example of the power supply device according to the embodiment.

Next, an operation example of the power supply device 1 will be described with reference to the flowchart. FIG. 6 is a flowchart illustrating the operation example of the power supply device 1 according to the embodiment. In a case where charging is performed by switching the connection between the batteries 10A and 10B from the series connection to the parallel connection, the controller 50 firstly turns the switches SW_A, SW_B, and SW_C off (step S1). Next, the controller 50 detects an initial voltage of the battery 10A by the voltage detector 30A, and detects an initial voltage of the battery 10B by the voltage detector 30B (step S2). Next, the controller 50 turns the switch SW_A on to separately connect the battery 10A to the quick charger CG without connecting the battery 10B to the quick charger CG (step S3). Then, the controller 50 supplies the constant current electric power from the quick charger CG to the battery 10A for a certain period of time, and detects the voltage VA of the battery 10A by the voltage detector 30A (step S4). Next, the controller 50 turns the switch SW_B on to separately connect the battery 10B to the quick charger CG without connecting the battery 10A to the quick charger CG (step S5). Then, the controller 50 supplies the constant current electric power from the quick charger CG to the battery 10B for a certain period of time, and detects the voltage VB of the battery 10B by the voltage detector 30B (step S6).

The controller 50 determines whether the potential difference between the voltage VA of the battery 10A and the voltage VB of the battery 10B is lower than the threshold value (step S7). In a case where the potential difference between the voltage VA of the battery 10A and the voltage VB of the battery 10B is lower than the threshold value (Yes at step S7), the controller 50 turns the switches SW_A and SW_B on to switch the connection between the respective batteries 10A and 10B to the parallel connection, so that the batteries 10A and 10B are charged (step S8). Then, in a case where the state of charge of each of the batteries 10A and 10B reaches 100% and the parallel charging is ended, the controller 50 turns the switches SW_A and SW_B off to end the parallel charging (step S9).

At step S7 described above, in a case where the potential difference between the voltage VA of the battery 10A and the voltage VB of the battery 10B is the threshold value or higher (No at step S7) and the voltage VA of the battery 10A is smaller than the voltage VB of the battery 10B (Yes at step S10), the controller 50 calculates the charging time of the battery 10A (step S11). The controller 50 calculates the charging time based on, for example, the actual voltage increase in the battery 10A per unit time and the potential difference. Then, the controller 50 turns the switch SW_A on during the calculated charging time, so as to separately connect the battery 10A to the quick charger CG and to supply the constant current electric power from the quick charger CG to the battery 10A for a certain period of time, so that the battery 10A is charged (step S12). Next, the controller 50 detects the voltage VA of the battery 10A by the voltage detector 30A (step S13), and determines whether the potential difference between the voltage VA of the battery 10A after charging and the voltage VB of the battery 10B is lower than the threshold value after returning to step S7.

At step S10 described above, in a case where the voltage VB of the battery 10B is smaller than the voltage VA of the battery 10A (No at step S10), the controller 50 calculates the charging time of the battery 10B (step S14). The controller 50 calculates the charging time based on, for example, the actual voltage increase in the battery 10B per unit time and the potential difference. Then, the controller 50 turns the switch SW_B on during the calculated charging time, so as to separately connect the battery 10B to the quick charger CG and to supply the constant current electric power from the quick charger CG to the battery 10B for a certain period of time, so that the battery 10B is charged (step S15). Next, the controller 50 detects the voltage VB of the battery 10B by the voltage detector 30B (step S16), and determines whether the potential difference between the voltage VA of the battery 10A and the voltage VB of the battery 10B after charging is lower than the threshold value after returning to step S7.

As described above, the power supply device 1 according to the embodiment includes the battery 10A and the battery 10B that is chargeable and dischargeable with the electric power, the voltage detector 30A that detects the voltage VA of the battery 10A, the voltage detector 30B that detects the voltage VB of the battery 10B, the switching section 40 that switch the connection between the battery 10A and the battery 10B to the series connection or the parallel connection, and the controller 50 that controls the switching section 40. In a case where the connection between the battery 10A and the battery 10B is switched from the series connection to the parallel connection to charge the battery 10A and the battery 10B by the external charger CG, the controller 50 does not switch the connection between the battery 10A and the battery 10B to the parallel connection, does not charge one battery having a larger voltage out of the battery 10A and the battery 10B, and separately charges the other battery having a smaller voltage when the potential difference between the voltage VA of the battery 10A detected by the voltage detector 30A and the voltage VB of the battery 10B detected by the voltage detector 30B is the predetermined threshold value or higher; and the controller 50 switches the connection between the battery 10A and the battery 10B to the parallel connection to charge the battery 10A and the battery 10B when the potential difference is lower than the threshold value.

With this configuration, in a case where the charging voltage of the electric power supplied from the quick charger CG is a relatively high-voltage (for example, about 1000 V), the power supply device 1 can switch the connection between the batteries 10A and 10B to the series connection, so that the batteries 10A and 10B are chargeable in series. In contrast, in a case where the charging voltage of the electric power supplied from the quick charger CG is a relatively low-voltage (for example, about 500 V), the controller 50 can switch the connection between the batteries 10A and 10B to the parallel connection, so that the batteries 10A and 10B are chargeable in parallel. That is, the power supply device 1 can correspond to the quick charger CG having a specification with a different charging voltage. In this case, since the power supply device 1 equalizes the voltages of the respective batteries 10A and 10B by charging and then connects the batteries 10A and 10B in parallel, the excessive inrush current can be prevented from flowing between the batteries 10A and 10B due to the potential difference. As a result, the power supply device 1 can properly charge the batteries 10A and 10B the connection of which can be switched between the series connection and the parallel connection. Since the power supply device 1 separately charges one battery having a smaller voltage in the voltage equalization process, the voltage equalization process can be performed without wasting energy compared with the conventional control through which the battery is discharged to perform voltage equalization. Since the power supply device 1 does not perform an adjustment by discharging during the voltage equalization process, it is possible to suppress an increase in the charging time. In the power supply device 1, it is possible to reduce parts such as a discharge resistor and a switch that are required for performing the voltage equalization by discharging a battery as in the related art, thereby making it possible to suppress an increase in the number of parts.

In the power supply device 1, the controller 50 controls the switching section 40 to connect the external charger CG to the battery 10A and to supply the constant current electric power from the external charger CG to the battery 10A for a certain period of time, and controls the switching section 40 to connect the external charger CG to the battery 10B and to supply the constant current electric power from the external charger CG to the battery 10B for a certain period of time. The voltage detector 30A detects the voltage VA of the battery 10A in a case where the constant current electric power is supplied from the external charger CG to the battery 10A. The voltage detector 30B detects the voltage VB of the battery 10B in a case where the constant current electric power is supplied from the external charger CG to the battery 10B. The controller 50 calculates the actual voltage increase in the battery 10A per unit time in the certain period of time based on the voltage VA of the battery 10A detected by the voltage detector 30A. In addition, the controller 50 calculates the actual voltage increase in the battery 10B per unit time in the certain period of time based on the voltage VB of the battery 10B detected by the voltage detector 30B. In a case where the potential difference between the batteries 10A and 10B is the threshold value or higher and the voltage VA of the battery 10A is smaller than the voltage VB of the battery 10B, the controller 50 calculates the charging time based on the actual voltage increase in the battery 10A per unit time and the potential difference, and charges the battery 10A based on the calculated charging time. In contrast, in a case where the voltage VB of the battery 10B is smaller than the voltage VA of the battery 10A, the controller 50 calculates the charging time based on the actual voltage increase in the battery 10B per unit time and the potential difference, and charges the battery 10B based on the calculated charging time. With this configuration, since the power supply device 1 can execute the voltage equalization process while charging the batteries with the maximum current Imax of the external charger CG, an increase in the charging time can be suppressed. Since the power supply device 1 charges the batteries 10A and 10B based on the calculated charging time, an increase in the number of times to separately charge the battery having a low-voltage can be suppressed compared with a case of charging based on a predetermined charging time. As a result, the power supply device 1 can properly charge the batteries 10A and 10B the connection of which can be switched between the series connection and the parallel connection.

Modified Example

Figure 7:
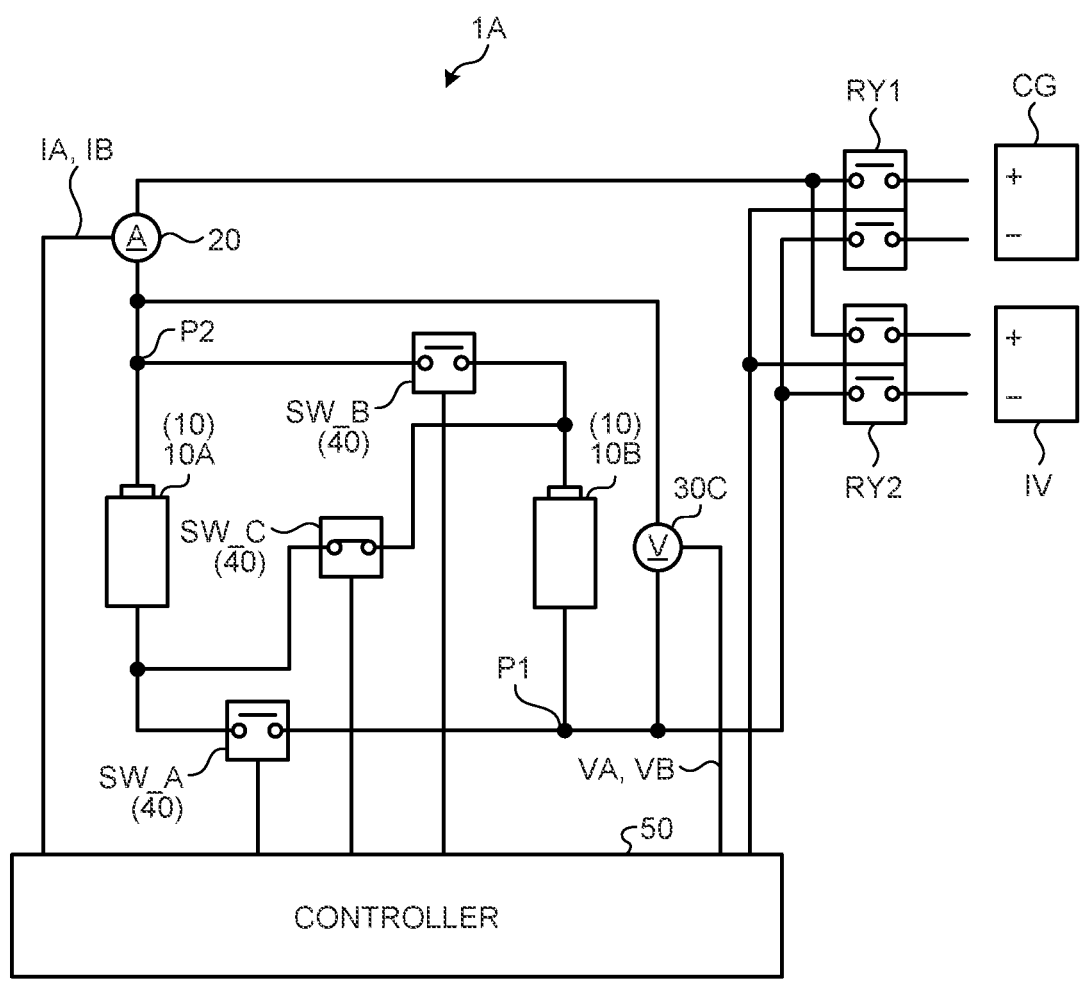
FIG. 7 is a block diagram illustrating a configuration example of a power supply device according to a modified example of the embodiment.

Next, a modified example of the embodiment will be described. In the modified example, the same components as in the embodiment are denoted by the same reference numerals, and the detailed descriptions thereof will not be repeated. FIG. 7 is a block diagram illustrating a configuration example of a power supply device 1A according to the modified example of the embodiment. The power supply device 1A according to the modified example is different from the power supply device 1 according to the embodiment in that a common voltage detector 30C detects the voltages VA and VB of the respective batteries 10A and 10B.

The power supply device 1A includes the battery units 10, the current detector 20, the voltage detector 30C, the switching section 40, the controller 50, a charging relay RY1, and a main relay RY2.

The charging relay RY1 is provided on a quick charging path, is turned on based on the switching signal output from the controller 50 to allow the current of the electric power supplied from the quick charger CG to the batteries 10A and 10B to pass through the path, and is turned off to shut off the current of the electric power supplied from the quick charger CG to the batteries 10A and 10B.

The main relay RY2 is provided on a path through which electric power is supplied to an inverter IV, is turned on based on the switching signal output from the controller 50 to allow the current of the electric power supplied from the batteries 10A and 10B to the inverter IV to pass through the path, and is turned off to shut off the current of the electric power supplied from the batteries 10A and 10B to the inverter IV.

One end of the voltage detector 30C is connected between the charging relay RY1 on a positive electrode side and the node P2, and the other end is connected between the charging relay RY1 on a negative electrode side and the node P1. The voltage detector 30C detects the voltage VA of the battery 10A in a state where the switch SW_A is turned on and the switches SW_B and SW_C, the charging relay RY1, and the main relay RY2 are turned off. The voltage detector 30C is connected to the controller 50 and outputs the detected voltage VA of the battery 10A to the controller 50. In addition, the voltage detector 30C detects the voltage VB of the battery 10B in a state where the switch SW_B is turned on and the switches SW_A and SW_C, the charging relay RY1, and the main relay RY2 are turned off. The voltage detector 30C outputs the detected voltage VB of the battery 10B to the controller 50.

As described above, since the power supply device 1A according to the modified example detects the voltages VA and VB of the respective batteries 10A and 10B by the common voltage detector 30C, it is possible to prevent a voltage error due to the different voltage detectors from each other and to suppress a decrease in the accuracy of the voltage equalization process.

In the above description, the example in which the controller 50 inputs the current detected by the current detector 20, but the present invention is not limited thereto, and for example, the controller 50 may input the current value during the quick charging by communication from the quick charger CG.

It is described that the controller 50 inputs the voltages VA and VB detected by the voltage detectors 30A and 30B respectively, but the present invention is not limited thereto, and for example, in a case where the voltages of the respective batteries 10A and 10B can be acquired from a battery management system (BMS) or a cell voltage sensor (CVS), which is provided on each of the batteries 10A and 10B, the voltages of the respective batteries 10A and 10B may be obtained from the BMS or the CVS.

Although the example in which the power supply device 1 includes two batteries 10A and 10B is described, the power supply device 1 may include three or more batteries.

In the power supply device according to the embodiment, when the potential difference between the first battery and the second battery is the threshold value or higher, the connection between the first and second batteries is not switched to the parallel connection, and one battery having a larger voltage out of the first battery and the second battery is not charged and the other battery having a smaller voltage is separately charged; and when the potential difference is lower than the threshold value, the connection between the first and second batteries is switched to the parallel connection to charge the first and second batteries. With this configuration, the power supply device can equalize the voltages of the first and second batteries by charging and then connect the first and second batteries in parallel, thereby making it possible to properly charge the batteries the connection of which can be switched between the series connection and the parallel connection.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A power supply device comprising:
a first battery and a second battery that are electrically chargeable and dischargeable;
a voltage detector that detects respective voltages of the first battery and the second battery;
a switching section configured to switch a connection between the first battery and the second battery to a series connection or a parallel connection; and
a controller configured to control the switching section, wherein
in a case where the connection between the first battery and the second battery is switched from the series connection to the parallel connection to charge the first battery and the second battery by an external charger, the controller does not switch the connection between the first battery and the second battery to the parallel connection, does not charge one battery having a larger voltage out of the first battery and the second battery, and separately charges the other battery having a smaller voltage when a potential difference between the voltage of the first battery detected by the voltage detector and the voltage of the second battery detected by the voltage detector is a predetermined threshold value or higher, and the controller switches the connection between the first battery and the second battery to the parallel connection and charges the first battery and the second battery when the potential difference is lower than the threshold value,
the controller controls the switching section to connect the external charger to the first battery and to supply constant current electric power from the external charger to the first battery for a certain period of time, and controls the switching section to connect the external charger to the second battery and to supply the constant current electric power from the external charger to the second battery for a certain period of time, the voltage detector detects the voltage of the first battery in a case where the constant current electric power is supplied from the external charger to the first battery, and detects the voltage of the second battery in a case where the constant current electric power is supplied from the external charger to the second battery, the controller calculates an actual voltage increase in the first battery per unit time in the certain period of time based on the voltage of the first battery detected by the voltage detector and calculates an actual voltage increase in the second battery per unit time in the certain period of time based on the voltage of the second battery detected by the voltage detector, and in a case where the potential difference is the threshold value or higher, the controller calculates a first charging time based on the actual voltage increase in the first battery per unit time and the potential difference and charges the first battery based on the calculated first charging time when the voltage of the first battery is smaller than the voltage of the second battery, and the controller calculates a second charging time based on the actual voltage increase in the second battery per unit time and the potential difference and charges the second battery based on the calculated second charging time when the voltage of the second battery is smaller than the voltage of the first battery.

* * * * *